(12) United States Patent
Chang (10) Patent No.: US 10,728,639 B1
(45) Date of Patent: Jul. 28, 2020

(54) SPEAKER MOUNTING ASSEMBLY

(71) Applicant: Tzu-Chung Chang, Kaohsiung (TW)

(72) Inventor: Tzu-Chung Chang, Kaohsiung (TW)

( * ) Notice: Subject to any disclaimer, the term of this patent is extended or adjusted under 35 U.S.C. 154(b) by 0 days.

(21) Appl. No.: 16/502,077

(22) Filed: Jul. 3, 2019

(51) Int. Cl.
*H04R 1/02* (2006.01)
*F16M 13/02* (2006.01)

(52) U.S. Cl.
CPC ........... *H04R 1/026* (2013.01); *F16M 13/027* (2013.01); *H04R 1/025* (2013.01); *H04R 2201/021* (2013.01)

(58) Field of Classification Search
CPC .. H04R 1/026; H04R 1/025; H04R 2201/021; F16M 13/02; F16M 13/027
See application file for complete search history.

(56) References Cited

U.S. PATENT DOCUMENTS

| 2011/0180678 A1* | 7/2011 | Liu | F21V 21/046 |
| | | | 248/343 |
| 2019/0277318 A1* | 9/2019 | Swan | B25B 5/14 |

\* cited by examiner

*Primary Examiner* — Walter F Briney, III
(74) *Attorney, Agent, or Firm* — Alan D. Kamrath; Mayer & Williams PC (57) ABSTRACT

A speaker mounting assembly includes a frame to which a plurality of fixing seats is coupled. Each fixing seat includes a sliding space, a guiding groove aligned with the sliding space, and an engagement portion that has a stop portion aligned with the sliding space and an ejection port intercommunicating with the sliding space. The ejection port includes an actuating portion. A fixing member is slidably received in the sliding space and is pivotably connected to an engaging plate movable through the ejection port. The fixing member abuts against one of a first limiting member aligned with the stop portion and a second limiting member having a coupling and abutting block and an interlocking pin. The interlocking pin is retractable into or extendable beyond the actuating portion, such that the coupling and abutting block abuts against or does not abut against the fixing member.

9 Claims, 8 Drawing Sheets

SPEAKER MOUNTING ASSEMBLY

BACKGROUND OF THE INVENTION

1. Field of the Invention

The present invention relates to a speaker mounting assembly and, more particularly, to a speaker mounting assembly that can be fixed to a ceiling or a mounting hole in a wall.

2. Description of the Related Art

To fulfill the acoustic demands of customers, a speaker of audio/video equipment is mounted to a wall or a ceiling to form a proper acoustic field in an indoor space. However, the procedure for mounting the speaker to the wall or ceiling is troublesome and requires additional tools for fixing purposes, which is very inconvenient in installation.

SUMMARY OF THE INVENTION

To solve the above problems, an objective of the present invention is to provide a speaker mounting assembly to thereby simplify the installation procedure.

When the terms "front", "rear", "left", "right", "up", "down", "top", "bottom", "inner", "outer", "side", and similar terms are used herein, it should be understood that these terms have reference only to the structure shown in the drawings as it would appear to a person viewing the drawings and are utilized only to facilitate describing the invention, rather than restricting the invention.

As used herein, the term "one" or "an" for describing the number of the elements and members of the present invention is used for convenience only, provides the general meaning of the scope of the present invention, and should be interpreted to include one or at least one. Furthermore, unless explicitly indicated otherwise, the concept of a single component also includes the case of plural components.

As used herein, the term "coupling", "join", "assembly", or similar terms is used to include separation of connected members without destroying the members after connection or inseparable connection of the members after connection. A person having ordinary skill in the art would be able to select according to desired demands in the material or assembly of the members to be connected.

A speaker mounting assembly according to the present invention includes a frame having an installation portion. A plurality of fixing seats is coupled to the installation portion of the frame. Each of the plurality of fixing seats includes a sliding space and a guiding groove aligned with the sliding space. Each of the plurality of fixing seats includes an engagement portion having a stop portion aligned with the sliding space and an ejection port intercommunicating with the sliding space. The ejection port includes an actuating portion. A fixing member is pivotably connected to an engaging plate. The fixing member is slidably received in the sliding space through the guiding groove. The engaging plate is movable through the ejection port in a radial direction relative to the fixing member. A limiting unit is disposed in the guiding groove and includes a first limiting member and a second limiting member. The fixing member abuts against one of the first limiting member and the second limiting member. The first limiting member is aligned with the stop portion. The second limiting member includes a coupling and abutting block and an interlocking pin opposite to the coupling and abutting block. The coupling and abutting block faces the first limiting member and is aligned with the stop portion. The interlocking pin is retractable into or extendable beyond the actuating portion, such that the coupling and abutting block abuts against or does not abut against the fixing member.

Thus, in the speaker mounting assembly according to the present invention, the limiting unit is actuated to control sliding movement of the fixing member in the fixing seat, such that the engaging plate can be ejected out of or folded in the fixing seat. Thus, no extra fastening tools are required for installation and maintenance of the speaker, improving the use convenience.

In an example, each of the plurality of fixing seats includes a top end and a coupling end opposite to the top end. The sliding space extends from the top end through the coupling end. An abutting member is coupled to the top end. The coupling end is coupled to the installation portion of the frame.

In an example, the fixing member includes a sliding portion slidably received in the sliding space. The engaging plate is pivotably mounted to the sliding portion by a pivotal pin. The pivotal pin is pivotably connected to an elastic returning member. The elastic returning member includes two ends abutting against the engaging plate and an inner wall of the fixing seat, respectively.

In an example, the fixing member includes an extending portion connected to the sliding portion. The extending portion includes an elastic element. Compression and elastic returning of the elastic element cause movement of the sliding portion in the sliding space.

In an example, the extending portion includes an extending member connected to the sliding portion. The extending member extends through a hole of the abutting member. The extending member has a cross sectional area smaller than a cross sectional area of the sliding portion, forming a reduced portion between the extending member and the sliding portion. An outer periphery of the extending member engages with the elastic element. Two ends of the elastic element abut against the abutting member and the sliding portion, respectively.

In an example, the first limiting member includes a protruding end and an abutting end opposite to the protruding end. An extension chamber is formed between the protruding end and the abutting end. An actuating plate is received in the extension chamber and is movable relative to the first limiting member to thereby extend across the guiding groove.

In an example, the actuating plate is orthogonal to the guiding groove and includes a first coupling and abutting face and a first inclined guiding face opposite to the first coupling and abutting face. The first coupling and abutting face faces a first end of the guiding groove. The first inclined guiding face faces a second end of the guiding groove.

In an example, the interlocking pin is biased by a second spring to abut against a pressing member in a direction orthogonal to an extending direction of the guiding groove. The pressing member is aligned with the actuating portion.

In an example, the second limiting member includes a pivotal portion between the coupling and abutting block and the interlocking pin to permit relative movement between the coupling and abutting block and the interlocking pin. The second limiting member is pivotably mounted between the guiding groove and the engagement portion by the pivotal portion.

The present invention will become clearer in light of the following detailed description of illustrative embodiments of this invention described in connection with the drawings.

DETAILED DESCRIPTION OF THE INVENTION

Figure 1:
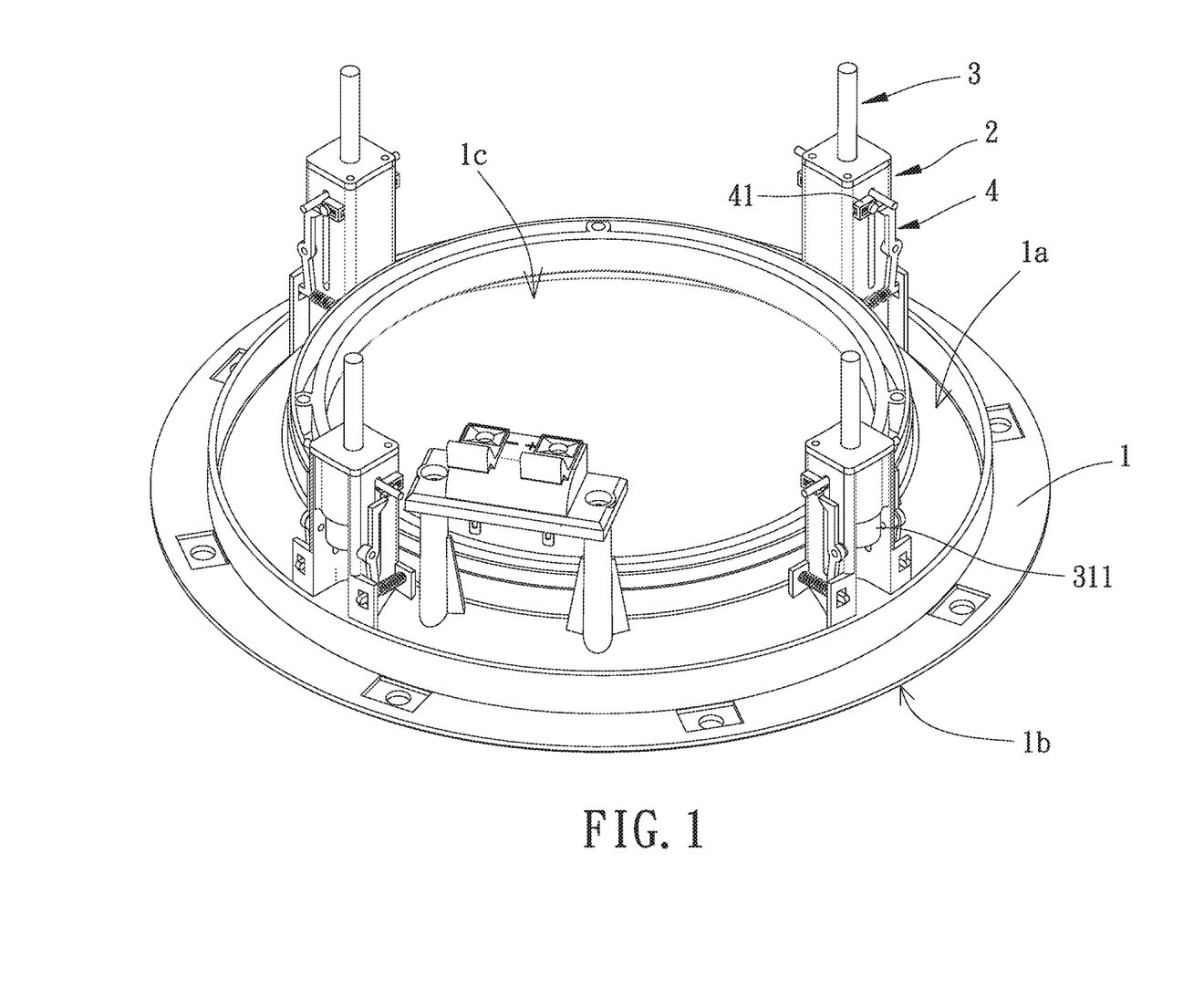
FIG. 1 is a perspective view of a speaker mounting assembly of an embodiment according to the present invention.
Figure 6:
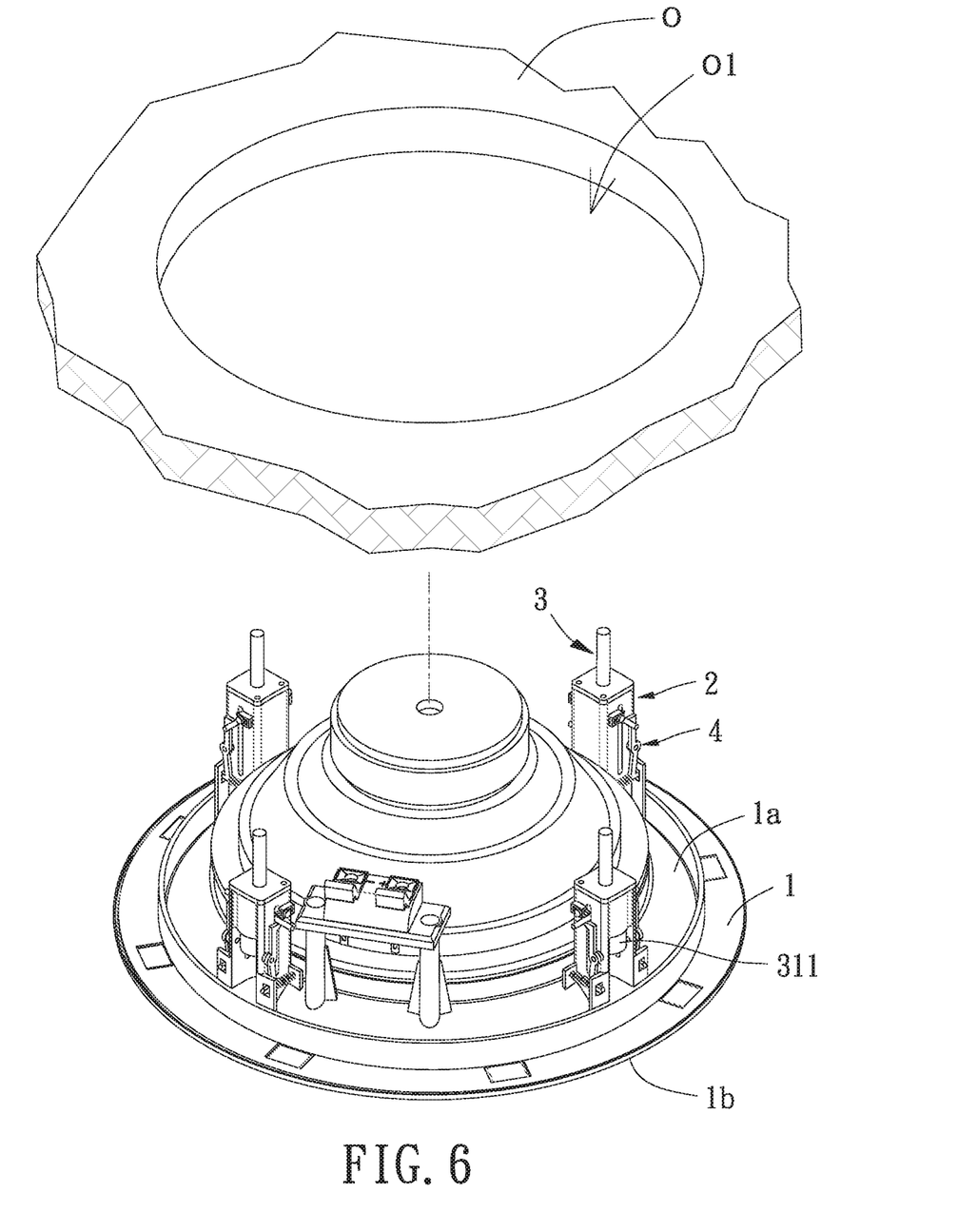
FIG. 6 is a diagrammatic perspective view illustrating installation of the speaker mounting assembly of the embodiment according to the present invention.

With reference to FIGS. 1 and 6, a speaker mounting assembly of an embodiment according to the present invention includes a frame 1 and a plurality of fixing seats 2 coupled to the frame 1. Each of the plurality of fixing seats 2 is provided with a fixing member 3 slidable relative to the fixing seat 2, and at least one limiting unit 4 limiting the relative sliding movement between the fixing member 3 and the fixing seat 2.

The frame 1 can be installed on a fixed object O. As used herein, the term "fixed object O" refers to a ceiling, a wall, or any ornamental object providing the same function in architecture ornamentation. In this embodiment, the fixed object O is a ceiling. The frame 1 can be any frame having a cylindrical, parallelepiped, or other geometric shape. A conventional speaker can be fixed to the frame 1 in advance, such as by threading connection, coupling, or press-fit, as the present invention is not limited in this regard. Specifically, the frame 1 includes an installation portion 1a and a speaker fixing portion 1b opposite to the installation portion 1a. The installation portion 1a is used to couple with an installation hole O1 of the fixed object O. The speaker fixing portion 1b can be used to fix the conventional speaker. Furthermore, the frame 1 includes a hollow portion 1c extending from the installation portion 1a through the speaker fixing portion 1b. Thus, the wires of the conventional speaker can conveniently extend through the ceiling for wiring in the ceiling.

Figure 2:
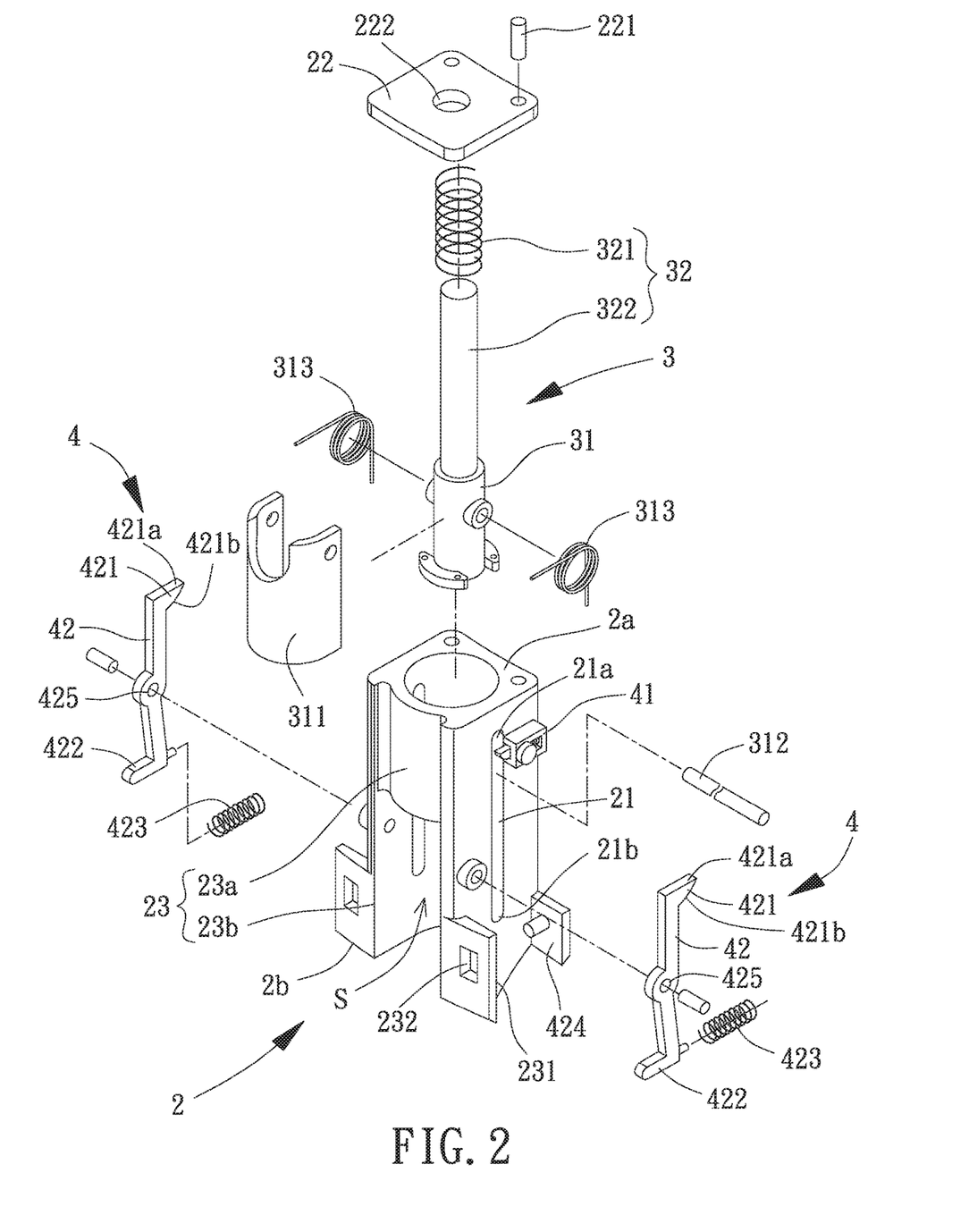
FIG. 2 is an exploded, perspective view of a fixing seat of the speaker mounting assembly of the embodiment according to the present invention.

With reference to FIGS. 1 and 2, the plurality of fixing seats 2 is coupled to the installation portion 1a of the frame 1. The number of the plurality of fixing seats 2 is not limited, as long as it permits geometric symmetric distribution of the plurality of fixing seats 2 on the installation portion 1a, as the present invention is not limited in this regard. This permits the frame 1 to be securely mounted to the fixed object O. Specifically, each of the plurality of fixing seats 2 includes a top end 2a and a coupling end 2b opposite to the top end 2a. A sliding space S is defined between the top end 2a and the coupling end 2b. In this embodiment, the sliding space S extends from the top end 2a through the coupling end 2b, forming an opening in the top end 2a for mounting the fixing member 3 while permitting the fixing member 3 to slide between the top end 2a and the coupling end 2b. Each of the plurality of fixing seats 2 includes at least one guiding groove 21 intercommunicating with the sliding space S. Each guiding groove 21 includes a first end 21a and a second end 21b opposite to the first end 21a. The first end 21a is adjacent to the top end 2a. The second end 21b is adjacent to the coupling end 2b. In this embodiment, each of the plurality of fixing seats 2 includes two guiding grooves 21 located on two sides of the sliding space S and aligned with each other. The fixing member 3 can stably slide in the sliding space S from the first end 21a to the second end 21b through provision of the two guiding grooves 21. Furthermore, an abutting member 22 is fixed to the top end 2a to close the opening of the top end 2a. The abutting member 22 can be fixed to the top end 2a by an engaging member 221 to avoid the fixing member 3 from disengaging from the sliding space S. Furthermore, the coupling end 2b of each of the plurality of fixing seats 2 is coupled to the installation portion 1a of the frame 1.

An engagement portion 23 for engaging with a fixed object can be provided between the top end 2a and the coupling end 2b. The engagement portion 23 can be used to couple and abut the frame 1 against an inner surface of the fixed object O, thereby fixing the frame 1 to the fixed object O. Specifically, the engagement portion 23 includes, from the top end 2a towards the coupling end 2b in sequence, a stop portion 23a and an ejection port 23b. The stop portion 23a is aligned with the first end 21a of the guiding groove 21. The ejection port 23b is aligned with the second end 21b of the guiding groove 21 and intercommunicates with the sliding space S. Thus, the fixing member 3 can slide in the sliding space S to align with the stop portion 23a or the ejection port 23b and can be exposed via the ejection port 23b.

The ejection portion 23b can include at least one actuating portion 231 that can interlock with the limiting unit 4 for controlling positioning of the fixing member 3, which will be described in detail hereinafter. In this embodiment, when the at least one actuating portion 231 includes two actuating portions 231, the two actuating portions 231 are respectively located on two opposite sides of the ejection port 23b and are contiguous to the coupling end 2b of the fixing seat 2. Thus, the fixing seat 2 can reliably reach a desired depth in the fixed object O until the coupling end 2b of the fixing seat 2 is aligned with the fixed object O. Namely, the actuating portion 231 is actuated only when the speaker mounting assembly is completely installed into the installation hole O1 of the fixed object O.

With reference to FIG. 2, the fixing member 3 includes a sliding portion 31 and an extending portion 32 connected to the sliding portion 31. The sliding portion 31 is slidably received in the sliding space S and includes an engaging plate 311. A pivotal pin 312 extends through an upper end of the engaging plate 311, pivotably connecting the engaging plate 311 to the sliding portion 31. A lower end of the engaging plate 311 is a free end and can proceed with radial, upward movement relative to the sliding portion 31 when the engaging plate 311 pivots. Specifically, the pivotal pin 312 can be pivotably connected to an elastic returning member 313. The elastic returning member 313 can be a torsion spring and includes two ends abutting against the engaging plate 311 and an inner wall of the fixing seat 2, respectively. Thus, the lower end of the engaging plate 311 can be pressed and returned to move relative to the sliding portion 31. Furthermore, the pivotal pin 312 engages with and protrudes beyond the guiding groove 21 of the fixing seat 2. Thus, the sliding portion 31 can be aligned with the stop portion 23a or the ejection port 23b of the engagement portion 23 while sliding via the guiding groove 21.

The extending portion 32 can include an elastic element 321 having two opposite ends abutting against the abutting member 22 of the fixing seat 2 and the sliding portion 31, respectively. Compression and elastic returning of the elastic element 321 cause movement of the sliding portion 31 of the fixing member 3 in the sliding space S. In this embodiment, the extending portion 32 further includes an extending member 322 connected to the sliding portion 31. The extending member 322 can slide together with the sliding portion 31 to proceed with extension and retraction at the top end 2a of the fixing seat 2 and can extend through a hole 222 of the abutting member 22. Specifically, the extending member 322 has a cross sectional area smaller than a cross sectional area of the sliding portion 31, forming a reduced portion between the extending member 322 and the sliding portion 31. An outer periphery of the extending member 322 engages with the elastic element 321. Two ends of the elastic element 321 respectively abut against the abutting member 22 and the sliding portion 31 when the extending member 322 extends through the hole 222 of the abutting member 22. Thus, the extending member 322 can be used to position the elastic element 321 to assure compression of the elastic element 321 in a direction coaxial to the sliding portion 31, avoiding wobbling of the fixing member 3 during sliding in the sliding space S to thereby avoid wear.

Figure 3:
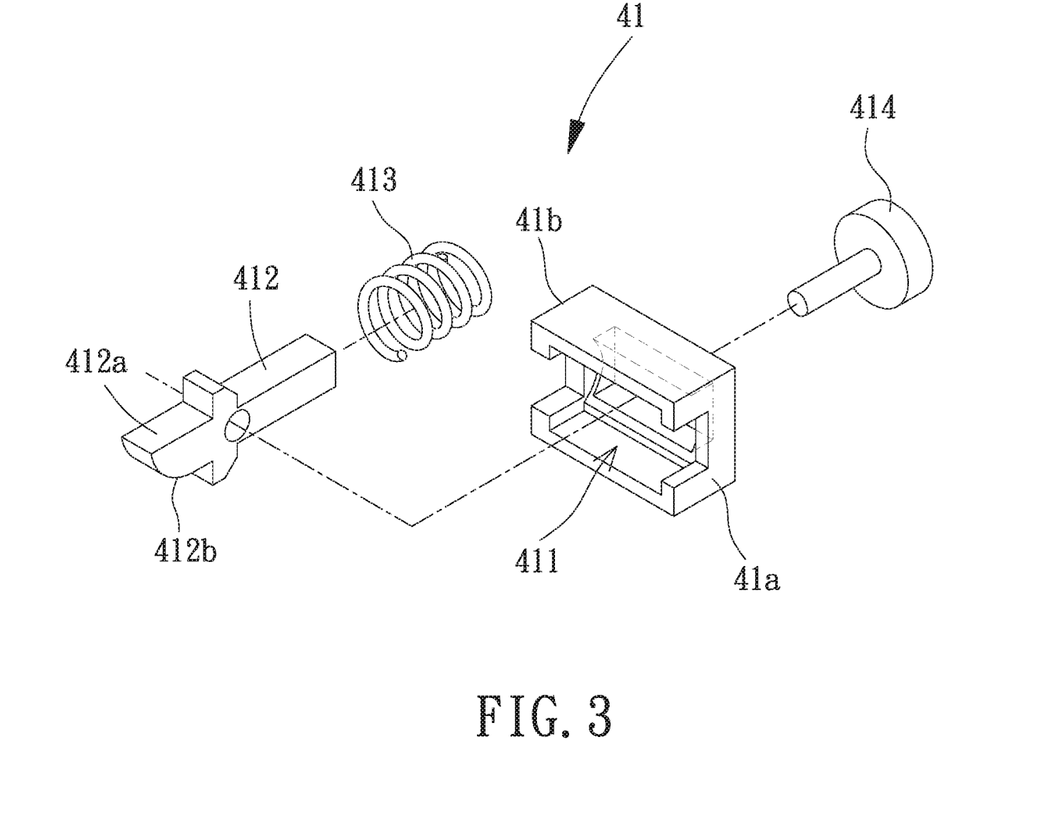
FIG. 3 is an exploded, perspective view of a first limiting member of the speaker mounting assembly of the embodiment according to the present invention.
Figure 4:
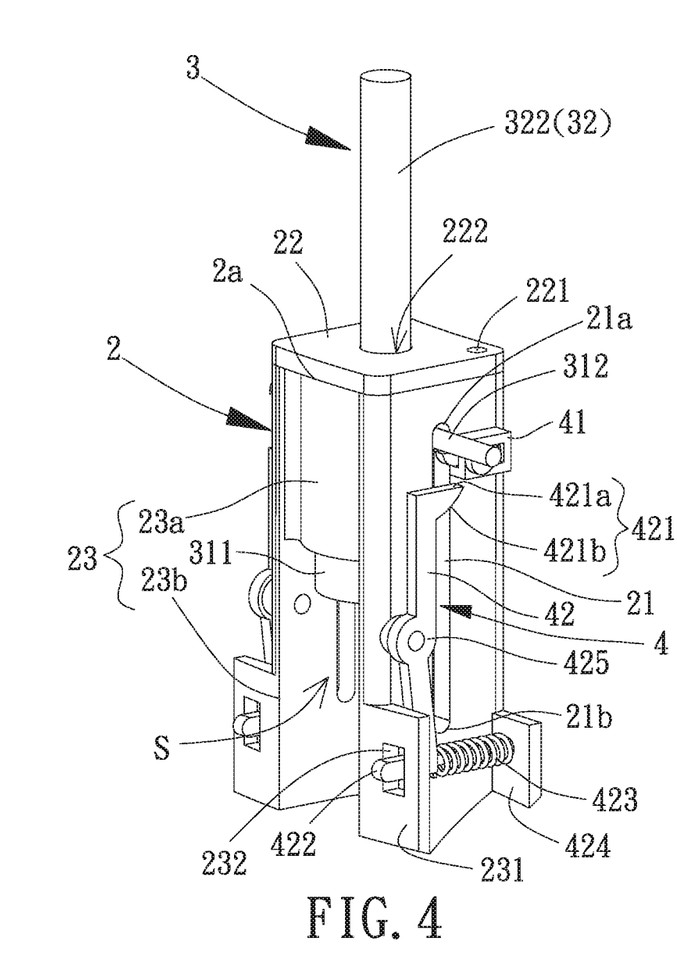
FIG. 4 is a perspective view of the speaker mounting assembly of the embodiment according to the present invention with a fixing member coupled and abutting against a top of the first limiting member.

With reference to FIGS. 2-4, the at least one limiting unit 4 is coupled to the fixing seat 2 and is aligned with the guiding groove 21. Each limiting unit 4 is disposed between the first end 21a and the second end 21b of the guiding groove 21 and includes, from the first end 21a towards the second end 21b in sequence, a first limiting member 41 and a second limiting member 42, limiting the fixing member 3 between the first end 21a and the first limiting member 41 or limiting the fixing member 3 between the first limiting member 41 and the second limiting member 42.

Specifically, the first limiting member 41 is located on a side of the guiding groove 21 and is aligned with the guiding groove 21. The first limiting member 41 includes a protruding end 41a and an abutting end 41b opposite to the protruding end 41a. An extension chamber 411 is formed between the protruding end 41a and the abutting end 41b. An actuating plate 412 is received in the extension chamber 411 and is movable relative to the first limiting member 41 to thereby extend across the guiding groove 21. In an example, the actuating plate 412 is biased by a first spring 413 to abut against the abutting end 41b. Thus, compression and elastic returning of the first spring 413 actuate the actuating plate 412 to retract into or extend out of the protruding end 41a of the first limiting member 41, thereby selectively extending across the guiding groove 21. Furthermore, the actuating plate 412 is orthogonal to the guiding groove 21 and includes a first coupling and abutting face 412a and a first inclined guiding face 412b opposite to the first coupling and abutting face 412a. The first coupling and abutting face 412a faces the first end 21a of the guiding groove 21. The first inclined guiding face 412b faces the second end 21b of the guiding groove 21. When the sliding portion 31 of the fixing member 3 slides in the guiding groove 21, the first coupling and abutting face 412a couples and abuts against the pivotal pin 312 of the sliding portion 31, limiting the sliding portion 31 to a position adjacent to the first end 21a of the guiding 21. Furthermore, the actuating plate 412 can include a button 414 permitting operation by a user to move the actuating plate 412 in the extension chamber 411 using the button 414.

Figure 5:
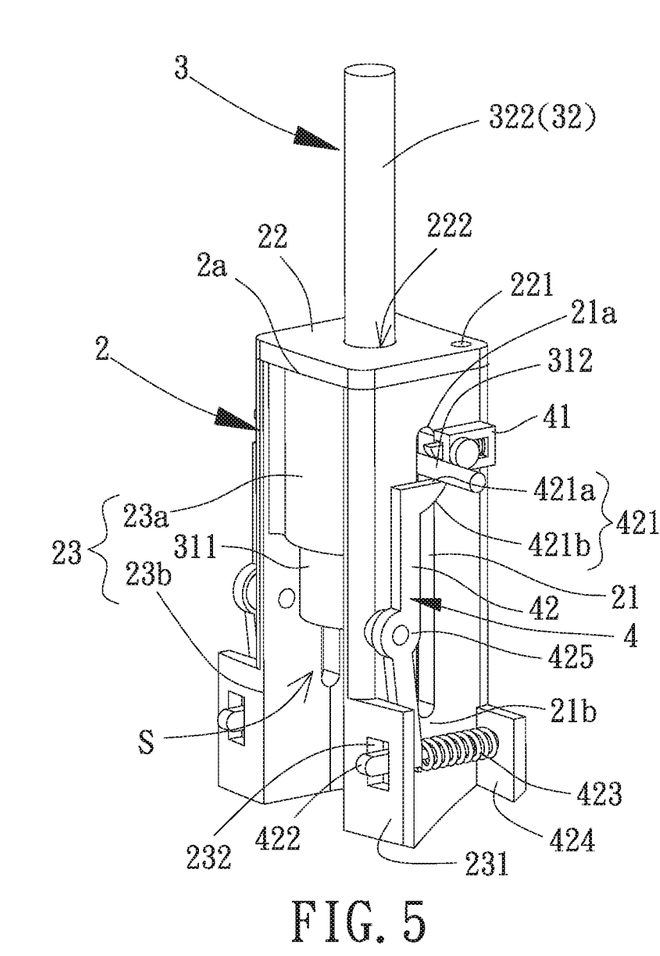
FIG. 5 is a perspective view of the speaker mounting assembly of the embodiment according to the present invention with the fixing member coupled and abutting against a top of a second limiting member.

With reference to FIGS. 2 and 5, the second limiting member 42 can be located on a side of the guiding groove 21 to extend across the guiding groove 21. Furthermore, the second limiting member 42 is located between the guiding groove 21 and the engagement portion 23. Specifically, the second limiting member 42 includes a coupling and abutting block 421 and an interlocking pin 422 opposite to the coupling and abutting block 421. The coupling and abutting block 421 can movably extend across the guiding groove 21. Furthermore, the coupling and abutting block 421 includes a second coupling and abutting face 421a and a second inclined guiding face 422b opposite to the second coupling and abutting face 421a. The second coupling and abutting face 421a faces the first limiting member 41. The second inclined guiding face 422b faces the second end 21b of the guiding groove 21. Thus, the second coupling and abutting face 421a can couple and abut against the pivotal pin 312 of the sliding portion 31 to limit the sliding portion 31 between the first limiting member 41 and the second limiting member 42. It is worth noting that the coupling and abutting block 421 of the second limiting member 42 can be aligned with the stop portion 23a of the engagement portion 23. When the pivotal pin 312 of the sliding portion 31 couples and abuts against the coupling and abutting block 421, the sliding portion 31 is aligned with the stop portion 23a of the engagement portion 23, such that the engaging plate 311 of the sliding portion 31 is stopped by the stop portion 23a and is folded in the fixing seat 2.

The interlocking pin 422 is aligned with the ejection port 23b of the engagement portion 23. Furthermore, the interlocking pin 422 can extend beyond an actuation port 232 of the actuating portion 231. The interlocking pin 422 can be pushed to retract into the actuation port 232 by abutting against the actuating portion 231. Furthermore, the interlocking pin 422 is biased by a second spring 423 to abut against a pressing member 424 in a direction orthogonal to an extending direction of the guiding groove 21. The pressing member 424 is aligned with the actuating portion 231. Thus, the interlocking pin 422 is retractable into or extending beyond the actuation port 232 of the actuating portion 231 under compression and elastic returning of the second spring 423, and the coupling and abutting block 421 is actuated to displace.

Specifically, the second limiting member 42 includes a pivotal portion 425 between the coupling and abutting block 421 and the interlocking pin 422. The second limiting member 422 is pivotably mounted between the guiding groove 21 and the engagement portion 23 by the pivotal portion 425. When the second limiting member 42 pivots about the pivotal portion 425, the coupling and abutting block 421 and the interlocking pin 422 can move relative to each other. Thus, when the interlocking pin 422 is pushed by the actuating portion 231 to retract in a direction towards the guiding groove 21, the coupling and abutting block 421 moves in a direction away from the guiding groove 21, such that the pivotal pin 312 of the fixing member 3 does not abut against the coupling and abutting block 421. Accordingly, the sliding portion 31 slides and is exposed via the ejection port 23b, and the engaging plate 311 can be ejected out of the ejection port 23b.

Figure 7:
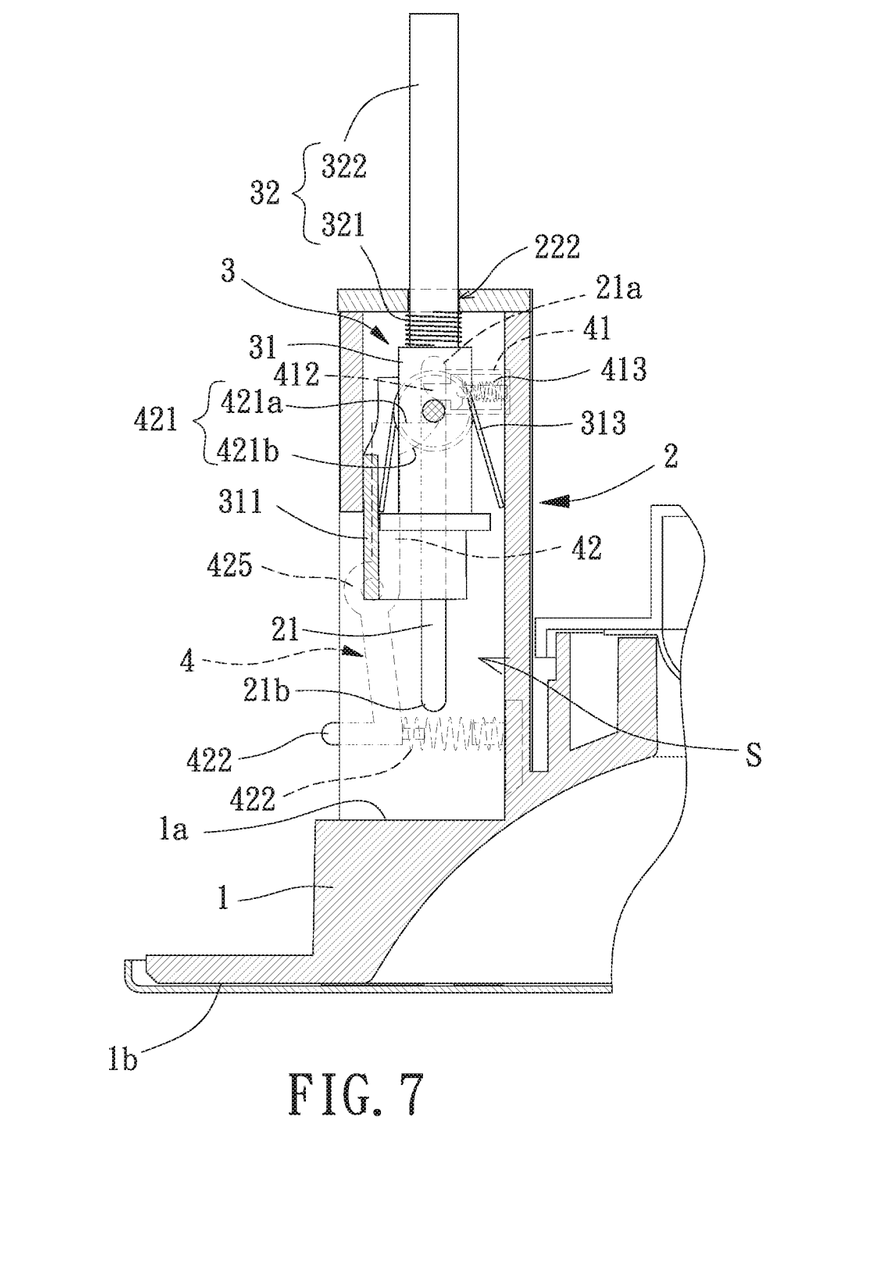
FIG. 7 is a cross sectional view illustrating an engaging plate of the speaker mounting assembly of the embodiment according to the present invention in a folded position.

With reference to FIGS. 6 and 7, the conventional speaker is fixed to the frame 1 of the speaker mounting assembly according to the present invention in advance. By the above structure, the limiting unit 4 can be used to abut the pivotal pin 312 of the fixing member 3 against the coupling and abutting block 421 of the second limiting member 42. Thus, the sliding portion 31 of the fixing member 3 is limited in the sliding space S and is aligned with the stop portion 23a of the engagement portion 23. At this time, the engaging plate 311 of the fixing member 3 is stopped by the stop portion 23a and is folded in the fixing seat 2.

Figure 8:
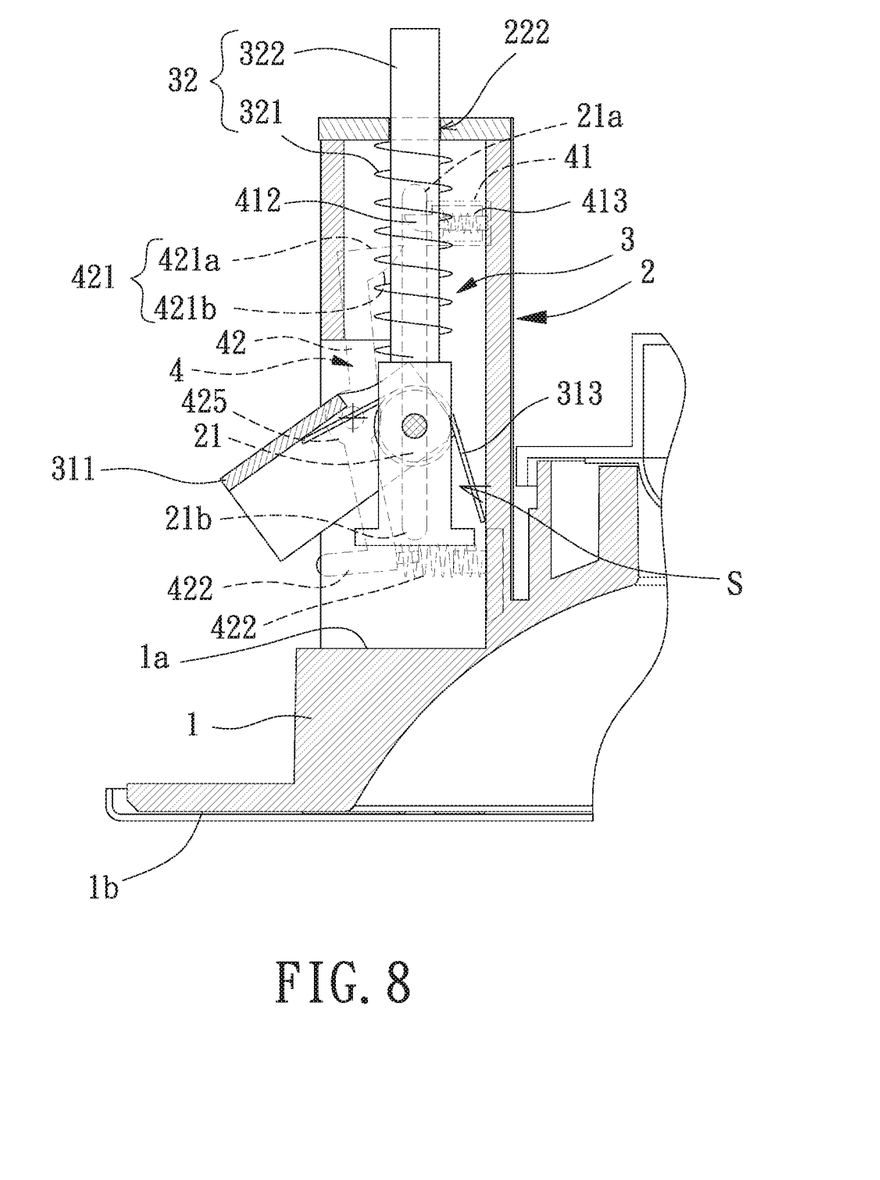
FIG. 8 is a cross sectional view illustrating the engaging plate of the speaker mounting assembly of the embodiment according to the present invention in an ejected position.
Figure 9:
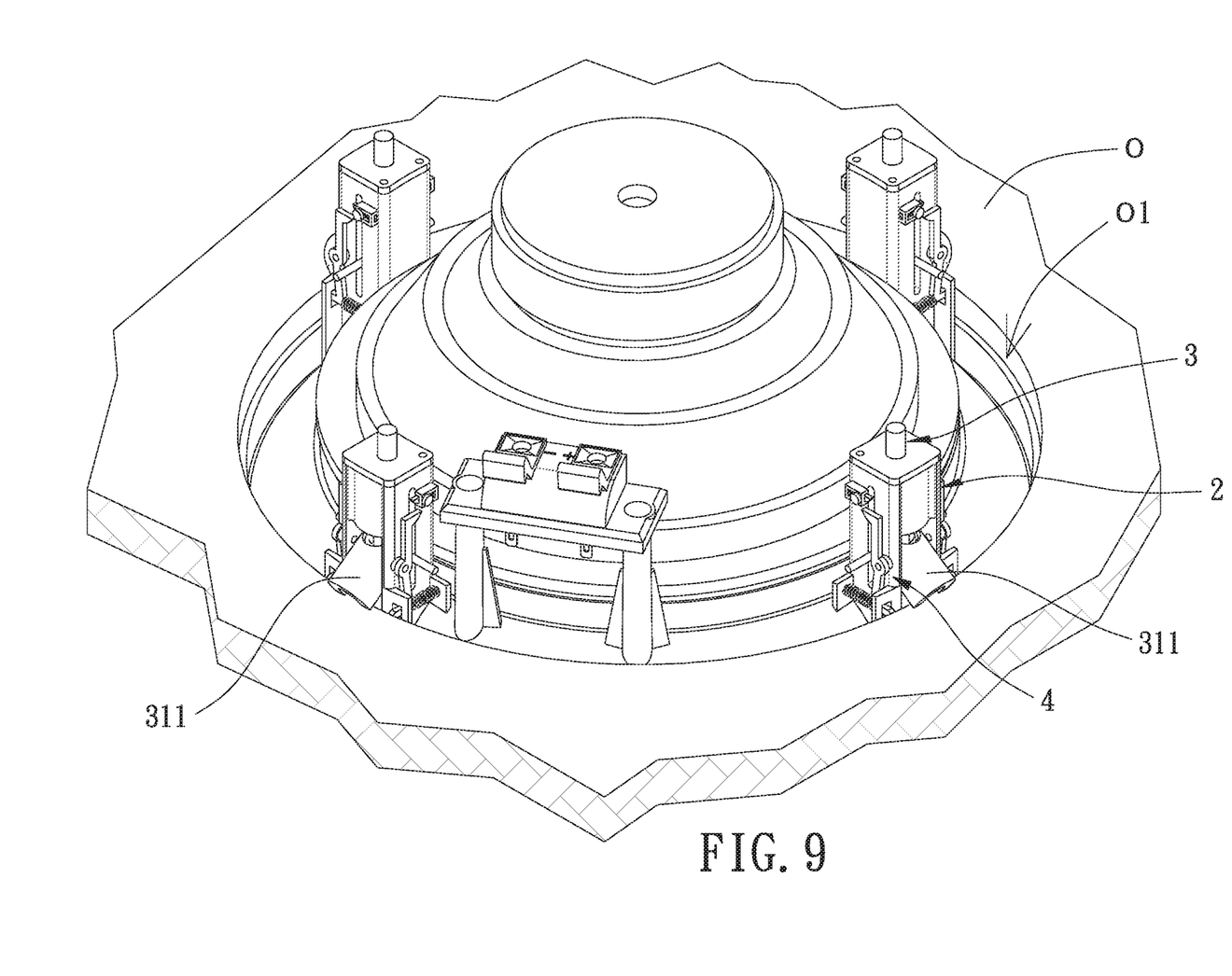
FIG. 9 is a perspective view of the speaker mounting assembly of the embodiment according to the present invention after installation.

With reference to FIGS. 8 and 9, when the frame 1 is installed in the installation hole O1 of the fixed object O, the engagement portion 23 of the fixing seat 2 comes in contact with the inner periphery of the installation hole O1. For example, the fixing seat 2 is placed deep into the installation hole O1 to make the actuating portion 231 of the ejection port 23b come into contact with the inner periphery of the installation hole O1. At this time, the interlocking pin 422 of the second limiting member 42 extending beyond the actuating portion 231 is pressed by the fixed object O to retract in the direction towards the guiding groove 21, moving the coupling and abutting block 421 of the second limiting member 42 in the direction away from the guiding groove 21, such that the pivotal pin 312 of the fixing member 3 is not abutted by the coupling and abutting block 421. Thus, the elastic element 321 of the fixing member 3 returns elastically to push the sliding portion 31 towards the coupling end 2b of the fixing seat 2 in the sliding space S. The sliding portion 31 slides from a position aligned with the stop portion 23a of the engagement portion 23 to another position exposed via the ejection port 23b. When the sliding portion 31 is exposed via the ejection port 23b, the engaging plate 311 is not stopped by the stop portion 23a and is subjected to the elastic returning force of the elastic returning member 313, such that the lower end of the engaging plate 311 is ejected out of the ejection port 23b. Thus, the engaging plate 311 can couple and abut against the inner periphery of the fixed object O or can abut against the inner periphery of the installation hole O1, thereby securely installing the speaker mounting assembly to the fixed object O.

With reference to FIG. 4, when it is desired to detach the speaker mounting assembly according to the present invention, the pivotal pin 312 of the fixing member 3 is pushed towards the first end 21a of the guiding groove 21 and passes through the first inclined guiding face 412b of the actuating plate 412, which easily retracts the actuating plate 412 into the extension chamber 411 of the first limiting member 41. Thus, the pivotal pin 312 couples and abuts against the actuating plate 412 between the first end 21a of the guiding groove 21 and the first limiting member 41, moving the sliding portion 31 towards the top end 2a of the sliding space S and limiting the sliding portion 31 to a position aligned with the stop portion 23a of the engagement portion 23. At this time, the engaging plate 311 is pressed by the stop portion 23a and is folded in the fixing seat 2. Accordingly, the engaging plate 311 no longer abuts against the inner surface of the fixed object O or the inner periphery of the installation hole O1. As a result, the speaker mounting assembly can be removed from the fixed object O. Furthermore, it is worth noting that the pivotal pin 312 couples and abuts against the actuating plate 412 between the first end 21a of the guiding groove 21 and the first limiting member 41, when the speaker mounting assembly is being detached, the engaging plate 311 will not eject out of the ejection port 23b even if the interlocking pin 422 of the second limiting member 42 extending beyond the actuating portion 231 is touched by mistake.

In view of the foregoing, in the speaker mounting assembly according to the present invention, the limiting unit 4 is actuated to control sliding movement of the fixing member 3 in the fixing seat 2, such that the engaging plate 311 can be ejected out of or folded in the fixing seat 2. Thus, no extra fastening tools are required for installation and maintenance of the speaker, improving the use convenience.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A speaker mounting assembly comprising:
   a frame including an installation portion;
   a plurality of fixing seats coupled to the installation portion of the frame, wherein each of the plurality of fixing seats includes a sliding space and a guiding groove aligned with the sliding space, wherein each of the plurality of fixing seats includes an engagement portion having a stop portion aligned with the sliding space and an ejection port intercommunicating with the sliding space, and wherein the ejection port includes an actuating portion;
   a fixing member pivotably connected to an engaging plate, wherein the fixing member is slidably received in the sliding space through the guiding groove, wherein the engaging plate is movable through the ejection port in a radial direction relative to the fixing member; and
   a limiting unit disposed in the guiding groove, wherein the limiting unit includes a first limiting member and a second limiting member, wherein the fixing member abuts against one of the first limiting member and the second limiting member, wherein the first limiting member is aligned with the stop portion, wherein the second limiting member includes a coupling and abutting block and an interlocking pin opposite to the coupling and abutting block, wherein the coupling and abutting block faces the first limiting member and is aligned with the stop portion, wherein the interlocking pin is retractable into or extendable beyond the actuating portion, such that the coupling and abutting block abuts against or does not abut against the fixing member.

2. The speaker mounting assembly as claimed in claim 1, wherein each of the plurality of fixing seats includes a top end and a coupling end opposite to the top end, wherein the sliding space extends from the top end through the coupling end, wherein an abutting member is coupled to the top end, and wherein the coupling end is coupled to the installation portion of the frame.

3. The speaker mounting assembly as claimed in claim 2, wherein the fixing member includes a sliding portion slidably received in the sliding space, wherein the engaging plate is pivotably mounted to the sliding portion by a pivotal pin, wherein the pivotal pin is pivotably connected to an elastic returning member, and wherein the elastic returning member includes two ends abutting against the engaging plate and an inner wall of the fixing seat, respectively.

4. The speaker mounting assembly as claimed in claim 3, wherein the fixing member includes an extending portion connected to the sliding portion, wherein the extending portion includes an elastic element, and wherein compression and elastic returning of the elastic element cause movement of the sliding portion in the sliding space.

5. The speaker mounting assembly as claimed in claim 4, wherein the extending portion includes an extending member connected to the sliding portion, wherein the extending member extends through a hole of the abutting member, wherein the extending member has a cross sectional area smaller than a cross sectional area of the sliding portion, forming a reduced portion between the extending member and the sliding portion, wherein an outer periphery of the extending member engages with the elastic element, and wherein two ends of the elastic element abut against the abutting member and the sliding portion, respectively.

6. The speaker mounting assembly as claimed in claim 1, wherein the first limiting member includes a protruding end and an abutting end opposite to the protruding end, wherein an extension chamber is formed between the protruding end and the abutting end, wherein an actuating plate is received in the extension chamber and is movable relative to the first limiting member to thereby extend across the guiding groove.

7. The speaker mounting assembly as claimed in claim 6, wherein the actuating plate is orthogonal to the guiding groove and includes a first coupling and abutting face and a first inclined guiding face opposite to the first coupling and abutting face, wherein the first coupling and abutting face faces a first end of the guiding groove, and wherein the first inclined guiding face faces a second end of the guiding groove.

8. The speaker mounting assembly as claimed in claim 1, wherein the interlocking pin is biased by a second spring to abut against a pressing member in a direction orthogonal to an extending direction of the guiding groove, and wherein the pressing member is aligned with the actuating portion.

9. The speaker mounting assembly as claimed in claim 1, wherein the second limiting member includes a pivotal portion between the coupling and abutting block and the interlocking pin to permit relative movement between the coupling and abutting block and the interlocking pin, and wherein the second limiting member is pivotably mounted between the guiding groove and the engagement portion by the pivotal portion.

* * * * *